(No Model.) 2 Sheets—Sheet 1.
T. BIDELMAN.
POTATO PLANTER.
No. 569,948. Patented Oct. 20, 1896.
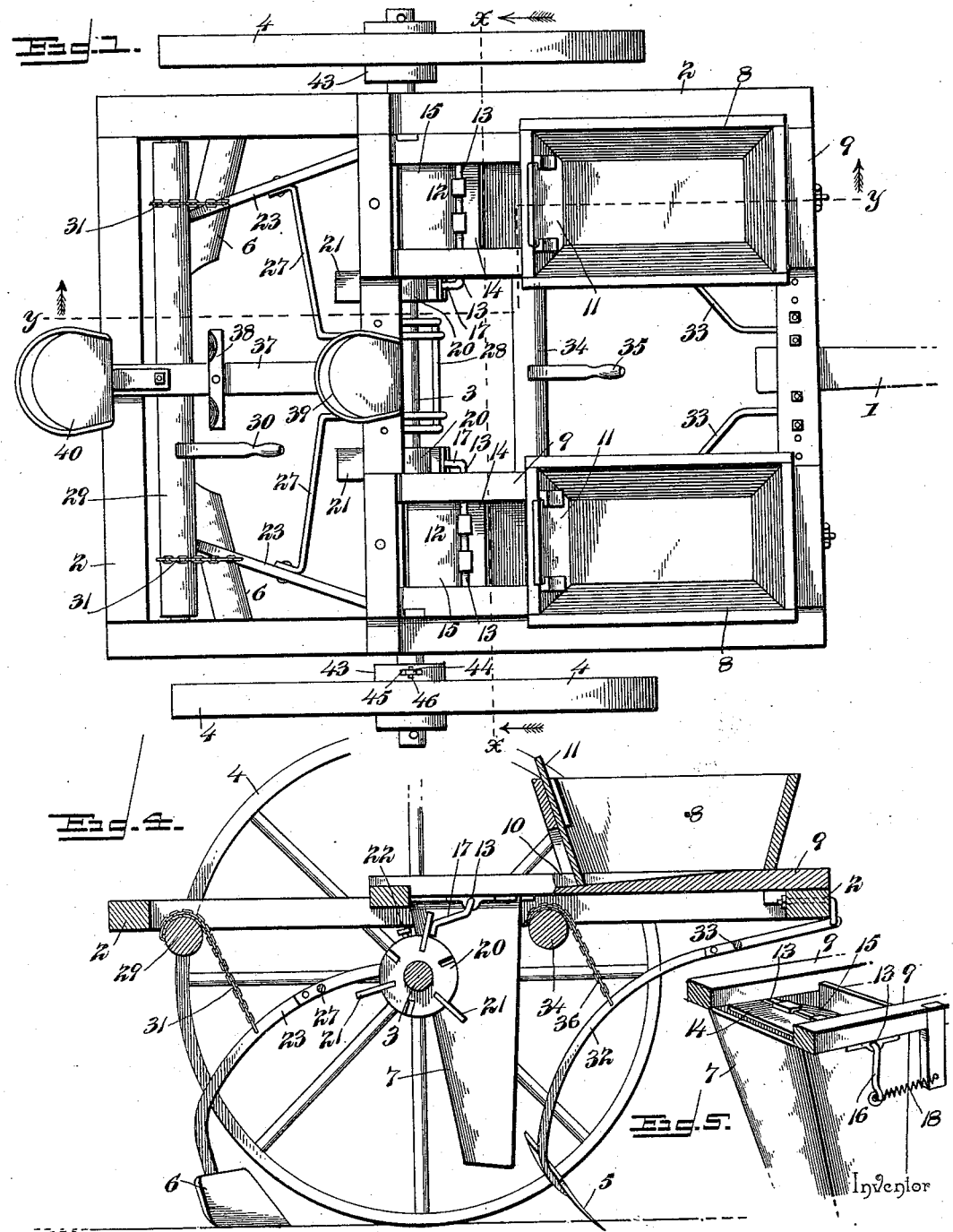
Witnesses
E. N. Stewart,
V. B. Hillyard.
Inventor
Thomas Bidelman
By his Attorneys,
C. A. Snow & Co.

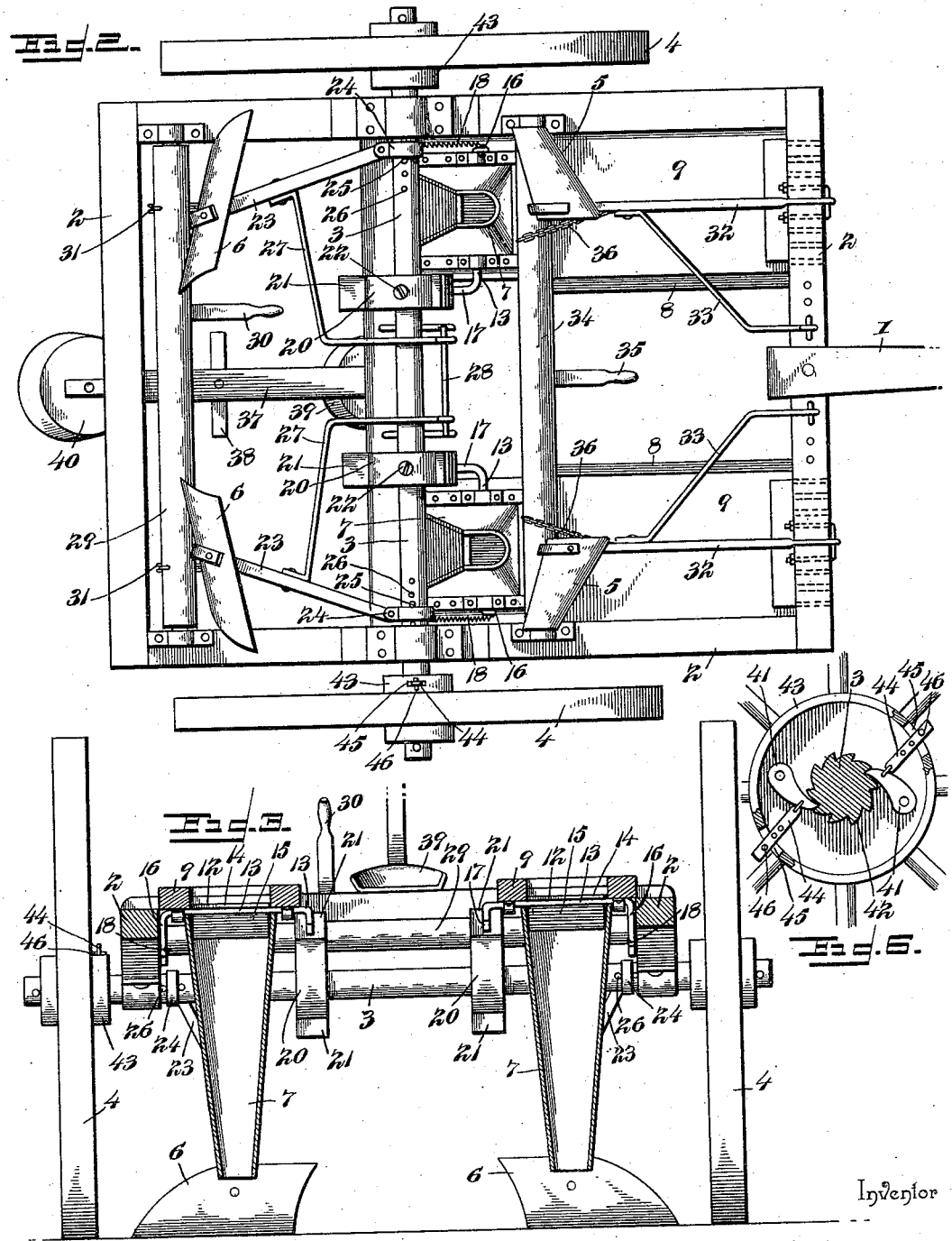

UNITED STATES PATENT OFFICE.

THOMAS BIDELMAN, OF PARSHALLVILLE, MICHIGAN, ASSIGNOR OF ONE-HALF TO PHILIP DORMIRE, OF SAME PLACE.

POTATO-PLANTER.

SPECIFICATION forming part of Letters Patent No. 569,948, dated October 20, 1896.

Application filed October 5, 1895. Serial No. 564,771. (No model.)

*To all whom it may concern:*

Be it known that I, THOMAS BIDELMAN, a citizen of the United States, residing at Parshallville, in the county of Livingston and State of Michigan, have invented a new and useful Potato-Planter, of which the following is a specification.

This invention relates to planters, and more especially to such as are designed for planting potatoes, and aims to provide a machine for dropping the seed in rows, and which is adjustable in its parts so as to form the rows at any required distance apart, and which will open the furrows in advance of the planting and cover the furrows after the seed has been dropped.

To attain the desired objects, the invention consists in certain novel features of construction and combinations of parts, substantially as herein illustrated, described, and particularly claimed.

In the accompanying drawings is illustrated an embodiment of the invention, although changes in the form, proportion, and the minor details may be resorted to without departing from the spirit or sacrificing any of the advantages of this invention, and in said drawings—

Figure 1 is a top plan view of the improved planter. Fig. 2 is a bottom plan view thereof. Fig. 3 is a transverse section on the line X X of Fig. 1, looking to the rear. Fig. 4 is a longitudinal section on the line Y Y of Fig. 1, looking in the direction of the arrow. Fig. 5 is a detail perspective view of the upper portion of a seed-spout, showing the relative disposition of the parts for actuating the valve. Fig. 6 is a detail view of the ratchet-and-pawl mechanism between the drive-wheel and its axle.

The same reference-numerals designate similar and corresponding parts in all the figures of the drawings, and in the latter 1 denotes the pole or tongue to which the draft is applied for drawing the machine over the field.

2 is the main frame, of substantially rectangular form; 3, the axle; 4, the ground-wheels, which are loosely mounted upon the spindles of the axle; 5, the furrow-opening shovels; 6, the coverers; 7, the seed-spouts, and 8 the hoppers for receiving the seed to be planted.

The hoppers are each mounted upon a base or frame 9, which is laterally adjustable upon the main frame 2 and which forms the bottom of the hopper. The intermediate portion of the base or frame 9 is recessed, and this recess gradually deepens from the front toward the rear of the machine, so as to form in effect a sloping bottom to the hopper over which glide the seed on their passage to the seed-spout. An opening is formed in the rear wall of each hopper directly above the said recess 10 and is closed by means of a slide 11, which operates in suitable ways formed at the inner sides of vertically-disposed cleats firmly attached to the said wall of the hopper.

The rear portion of the base or frame 9 is formed with an opening which is normally closed by a valve 12, which latter is mounted near its front end upon a transversely-disposed rod 13, the front portion 14 of the valve extending in the plane of the bottom of the recess 10 and the rear portion 15 inclining rearwardly and downwardly, so as to prevent the lodgment of the seed upon the front portion of the valve, and thereby insuring the dropping of the seed when the valve is operated.

The rod 13 is extended beyond the sides of the valve and is mounted in bearings secured to the lower side of the base or frame 9 upon opposite sides of the opening which is normally closed by the valve, and the terminal portions of the said rod are bent to form pendent arms 16 and 17. The arm 16 is connected by means of a spring 18 with a suitable portion of the base or frame 9, and this spring serves to hold the valve in a normal position and return it into an operative position after being operated to drop the seed. The arm 17 extends within the path of a suitably-constructed trip properly arranged upon the axle 3, so as to be engaged thereby to open the valve at the proper time to drop the seed into the furrow. The seed-spout 19 is located opposite the opening protected by the valve 12, and its lower end comes just in the rear of the contiguous furrow-opener 5.

The trip comprises a hub or collar 20 and a series of blades 21, which have their inner ends fitted into slots or suitably-disposed openings formed in the peripheral edge of the hub or collar. These blades 21 will be provided in sufficient number, so as to engage with the arm 17 to effect a dropping of the seed at the required and predetermined distances apart, and will be detachably connected with the hub or collar, so as to admit of any number being employed and the proper distribution of the same about the hub or collar. The hub or collar is adjustable on the axle and is provided with a binding-screw 22 to admit of its being secured to the axle at the located position.

The coverers 6 may be of any desired form and are secured to the lower ends of standards 23, which have adjustable connection with the axle 3, and for this purpose the upper or front ends of the standards have rings 24, which are mounted upon the said axle and are held between pins 25, which are passed through proper openings of the series of openings 26, formed transversely in the axle, so as to hold the standards at the required and proper position. L-shaped braces 27 connect the standards 23 with the horizontal portion of a U-shaped hanger 28, which is pendent from a cross-bar of the main frame and which has its lower portion curved so as to clear the axle 3. A roller 29 is journaled near the rear end of the frame 2, and is supplied with a handle 30, which extends within convenient reach of the driver's seat to be operated when it is required to raise or lower the coverers, and this roller is connected by means of chains 31 with the respective standards 23, so that upon the rotation or turning of the roller 29 the upper ends of the chains 31 will be wound thereon and cause a lifting of the coverers, as will be readily understood.

The furrow-opening shovels 5 may be of any form commonly employed for plowing or forming furrows, and are secured to the lower ends of standards 32, which have adjustable connection at their front ends with the main frame, and these standards 32 are strengthened by lateral braces 33, which are likewise adjustably connected with the main frame, so as to admit of the lateral adjustment of the standards to vary the distance apart of the furrows. A roller 34, similar in construction to the roller 29, is journaled to the frame 2 and has a handle 35, and is connected by means of chains 36 with the standards 32, so that upon operating the handle 35 the roller will be turned in its bearings and the furrow-opening shovels will be raised or lowered, as desired.

A longitudinally-disposed seat-bar 37 is provided between its ends with a foot-rest 38, and a seat 39 is disposed at its front end and about in the plane of the frame 2, so that the attendant perched thereon will have the slides 11 and the handle 35 within convenient reach, and a seat 40 is located at the rear end of the said seat-bar for the driver, and the handle 30 extends within easy reach thereof.

One of the ground-wheels 4 constitutes the driver for imparting motion to the axle for operating the trips by means of which the valves are actuated, and the hub of this driver is provided at its inner end with a series of gravity-pawls 41, which are adapted to engage with the ratchet-teeth 42, formed in the contiguous portion of the axle, so as to cause the drive-wheel and axle to rotate in unison. These gravity-pawls 41 have pivotal connection with the hub of the drive-wheel and are housed by the sand-band 43, and links 44 have pivotal connection with the free ends of the said pawls and operate loosely in slots 45, provided in the sand-band, and openings are formed in the said links, into which are fitted pins 46 when it is desired to hold the gravity-pawls out of operative relation, so that the drive-wheel can rotate freely upon the axle without imparting any motion thereto.

The hoppers 8, the seed-spouts, and the seed-dropping mechanism are duplicated and are disposed upon opposite sides of the main frame, and these parts, as well as those intimately associated and coöperating therewith, are laterally adjustable with reference to the main frame to admit of the seed being planted in rows at varying distances apart, according to the nature of the ground and the seed to be planted.

Having thus described the invention, what is claimed as new is—

1. In a planter, the combination of a rotating axle, a laterally-adjustable furrow-opener and seed-dropping mechanism, a pendent hanger having a horizontal portion, a standard having a ring at its front end which is laterally adjustable upon the said axle, an L-brace attached to the standard and having slidable connection with the horizontal portion of the said pendent hanger, and a covering-blade secured to the lower end of the said standard, substantially as and for the purpose set forth.

2. In a planter, the combination of the following elements, to wit: a main frame, supplemental frames having independent lateral adjustment with respect to each other and the main frame, and having openings at their rear ends and recesses at their front ends which recesses gradually deepen toward and communicate with the said openings, hoppers attached to and movable with the supplemental frames and placed above their recessed ends, seed-spouts carried by and attached to the rear ends of the said frames directly opposite the openings therein, valves located at the upper ends of the seed-spouts and normally closing them and the openings of the supplemental frames, rods supporting the valves and having their opposite ends bent, springs engaging with one set of bent ends for normally retaining the valves closed, laterally-adjustable trips adapted to engage with the other set of bent ends of the said rods for actuating the valves, furrow openers and closers laterally adjustable to correspond with the position of the supplemental frames and the hoppers and seed-spouts carried thereby, and independent means for adjusting the furrow openers and closers so as to vary their distance from the surface of the ground, substantially in the manner set forth for the purpose described.

In testimony that I claim the foregoing as my own I have hereto affixed my signature in the presence of two witnesses.

THOMAS BIDELMAN.

Witnesses:
    STEVEN GANNON,
    JAMES GANNON.